United States Patent
Utermoehlen et al.

(10) Patent No.: US 12,504,302 B2
(45) Date of Patent: Dec. 23, 2025

(54) INDUCTIVE SENSOR WITH MONITORING OF THE EXCITATION SIGNAL

(71) Applicant: HELLA GmbH & Co. KGaA, Lippstadt (DE)

(72) Inventors: Fabian Utermoehlen, Lippstadt (DE); Volker Woessmann, Telgte (DE); Joerg Diekmann, Guetersloh (DE); Karsten Kuemmel, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 167 days.

(21) Appl. No.: 18/243,443

(22) Filed: Sep. 7, 2023

(65) Prior Publication Data

US 2023/0417578 A1    Dec. 28, 2023

Related U.S. Application Data

(63) Continuation of application No. PCT/EP2022/054875, filed on Feb. 25, 2022.

(30) Foreign Application Priority Data

Mar. 8, 2021  (DE) ................. 10 2021 105 484.2

(51) Int. Cl.
*G01D 5/20*    (2006.01)

(52) U.S. Cl.
CPC ......... *G01D 5/2053* (2013.01); *G01D 5/2046* (2013.01)

(58) Field of Classification Search
CPC ..................... G01D 5/2046; G01D 5/2053
See application file for complete search history.

(56) References Cited

U.S. PATENT DOCUMENTS

| 4,667,158 A * | 5/1987 | Redlich ............... G01D 5/2026 340/870.36 |
| 5,339,029 A * | 8/1994 | Wagner .............. B65H 23/0204 324/207.17 |

(Continued)

FOREIGN PATENT DOCUMENTS

| DE | 19738841 A1 | 3/1999 |
| DE | 10159110 A1 | 6/2003 |

(Continued)

OTHER PUBLICATIONS

International Search Report dated Jun. 9, 2022 in corresponding application PCT/EP2022/054875.

*Primary Examiner* — Steven L Yeninas
(74) *Attorney, Agent, or Firm* — Muncy, Geissler, Olds & Lowe, P.C.

(57) ABSTRACT

An inductive sensor, in particular a length sensor or an angle sensor, including an oscillator for generating a sinusoidal excitation signal having a first excitation frequency. A resonant circuit is connected to the oscillator and may be excited by the excitation signal to generate an electromagnetic field. A coupling element is movable relative to the resonant circuit, for changing the field as a function of a length or a rotation angle. A sensor generates an electrical sensor signal as a function of the field, A measuring transducer generates a measuring transducer output signal as a function of the electrical sensor signal, which represents the length or the rotation angle, and a checking filter checks the sinusoidal form of the excitation signal.

4 Claims, 2 Drawing Sheets

(56) References Cited

U.S. PATENT DOCUMENTS

| | | |
|---|---|---|
| 6,255,810 B1 | 7/2001 | Irle et al. |
| 6,287,020 B1 | 9/2001 | Osaka et al. |
| 11,231,296 B2 | 1/2022 | Hess et al. |
| 2004/0056653 A1 | 3/2004 | Bocek et al. |
| 2005/0126270 A1* | 6/2005 | Shao ................ G01D 5/165 73/114.37 |
| 2008/0204116 A1* | 8/2008 | James ............... G01D 5/2093 327/517 |
| 2012/0010849 A1* | 1/2012 | Yamada ............ H03M 1/0617 702/151 |
| 2012/0256773 A1* | 10/2012 | Takahashi ........ G01D 5/2046 341/118 |
| 2017/0299409 A1* | 10/2017 | Hess ................ G01D 5/2291 |
| 2019/0025052 A1* | 1/2019 | Nee .................. G01D 5/00 |
| 2020/0225063 A1* | 7/2020 | Hess ................ G01D 5/2291 |
| 2022/0268604 A1* | 8/2022 | Ham ................ H02K 24/00 |
| 2022/0302858 A1* | 9/2022 | Umamichi ........ G01D 3/08 |

FOREIGN PATENT DOCUMENTS

| | | |
|---|---|---|
| DE | 102014100624 A1 | 7/2015 |
| DE | 102018213244 A1 | 2/2020 |
| DE | 102018213402 A1 | 2/2020 |
| EP | 0909966 B1 | 12/2005 |
| EP | 3239662 A1 | 11/2017 |

* cited by examiner

INDUCTIVE SENSOR WITH MONITORING OF THE EXCITATION SIGNAL

This nonprovisional application is a continuation of International Application No. PCT/EP2022/054875, which was filed on Feb. 25, 2022, and which claims priority to German Patent Application No. 10 2021 105 484.2, which was filed in Germany on Mar. 8, 2021, and which are both herein incorporated by reference.

BACKGROUND OF THE INVENTION

Field of the Invention

The present invention relates to an inductive sensor, in particular a length sensor or an angle sensor, comprising an oscillator for generating a sinusoidal excitation signal having a first excitation frequency; a resonant circuit, which is connected to the oscillator and may be excited by the excitation signal to generate an electromagnetic field; a coupling element, movable relative to the resonant circuit, for changing the field as a function of a length or a rotation angle; a sensor for generating an electrical sensor signal as a function of the field; and a measuring transducer for generating a measuring transducer output signal as a function of the electrical sensor signal, which represents the length or the rotation angle.

Description of the Background Art

Inductive angle sensors are disclosed, for example, in the documents EP 0 909 966 B1 (which corresponds to U.S. Pat. No. 6,287,020), DE 197 38 841 A1 (which corresponds to U.S. Pat. No. 6,255,810, and which is incorporated herein by reference), and DE 101 59 110 A1, which is incorporated herein by reference.

Angle sensors are frequently used in motor vehicles. Position sensors which are robust with respect to interference fields are needed primarily due to the increasing electrification of the vehicle. Inductive angle sensors based on coupled coils are a good choice here, which are already used extensively in accelerator pedals, steering sensors, as well as engine position sensors.

FIG. 1 shows a sensor of the conventional type, which does not check the sinusoidal form of the excitation signal.

Known inductive sensor 100 illustrated in FIG. 1 includes a circuit board having a sensor ASIC 500, which contains, among other things, an oscillator 300, which drives a resonant circuit with an exciter coil 200 arranged on the circuit board. Sensor 100 further contains a receiving coil system 201 on the circuit board, this coil system containing receiving coils 201.1, 201.2, 201.3 in each case, which are preferably connected to each other at a so-called star point. The signal processing for coil system 201 is implemented via a measuring transducer 301, which essentially contains filters, a demodulator, and a digital signal processing system. Sensor 100 further includes a suitable driver or a suitable interface for the purpose of sending a piece of sensor information to a control unit, which is not illustrated, via an output line 500.out.

Although the excitation signal does not, in principle, necessarily have to be sinusoidal, advantages are derived hereby with respect to the electromagnetic compatibility (e.g., emission) and in relation to the higher accuracy due to filters designed on the basis of purely sinusoidal signals having a certain frequency.

Disadvantages, however, may thus arise if the excitation signal is not sinusoidal.

SUMMARY OF THE INVENTION

It is therefore an object of the present invention to provide a possibility for checking whether or not the excitation signal is sinusoidal.

This object is achieved according to the invention in that the inductive sensor includes a filter for checking the sinusoidal form of the excitation signal. A filter of this type for checking the sinusoidal form makes it possible to determine that the excitation signal deviates from the sinusoidal form. If a deviation is detected, an intervention may even be made automatically to ensure a sinusoidal form of the excitation signal.

The filter for checking the sinusoidal form may include a bandpass filter, whose pass band is selected in such a way that it allows frequency portions of a signal in the range of the excitation frequency to pass. The bandpass filter may have an input which is connected to the output of the oscillator.

It is likewise possible that the checking filter includes an analog/digital converter for digitizing an analog signal, which has an input. The latter may be connected to the output of the oscillator or the bandpass. This makes it possible to digitize the excitation signal filtered by the bandpass or the unfiltered excitation signal.

However, it is also possible that the output of the analog/digital converter is connected to the input of the bandpass filter if the input of the analog/digital converter is connected to the output of the oscillator.

The filter for checking the sinusoidal form may include a rectifier, which has an input. This input may be connected to the output of the bandpass filter.

It is furthermore possible that the filter for checking the sinusoidal form includes an FFT unit, which has an input. This input may be connected to the output of the analog/digital converter and transform a signal present at the input into the frequency range.

The filter for checking the sinusoidal form may include a comparison unit, which has an input connected to the output of the rectifier or the FFT unit and with the aid of which the output signal of the rectifier or the amplitude of the fundamental frequency in the output signal of the FFT unit may be compared with a predefined value.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
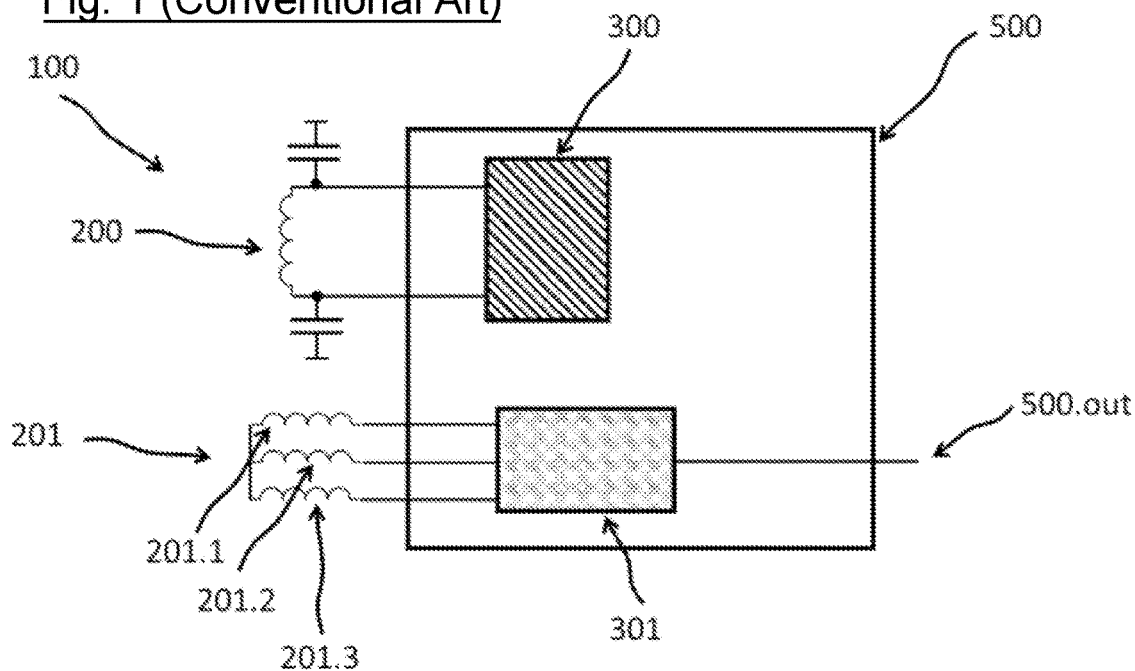
FIG. 1 shows a conventional sensor.
Figure 2:
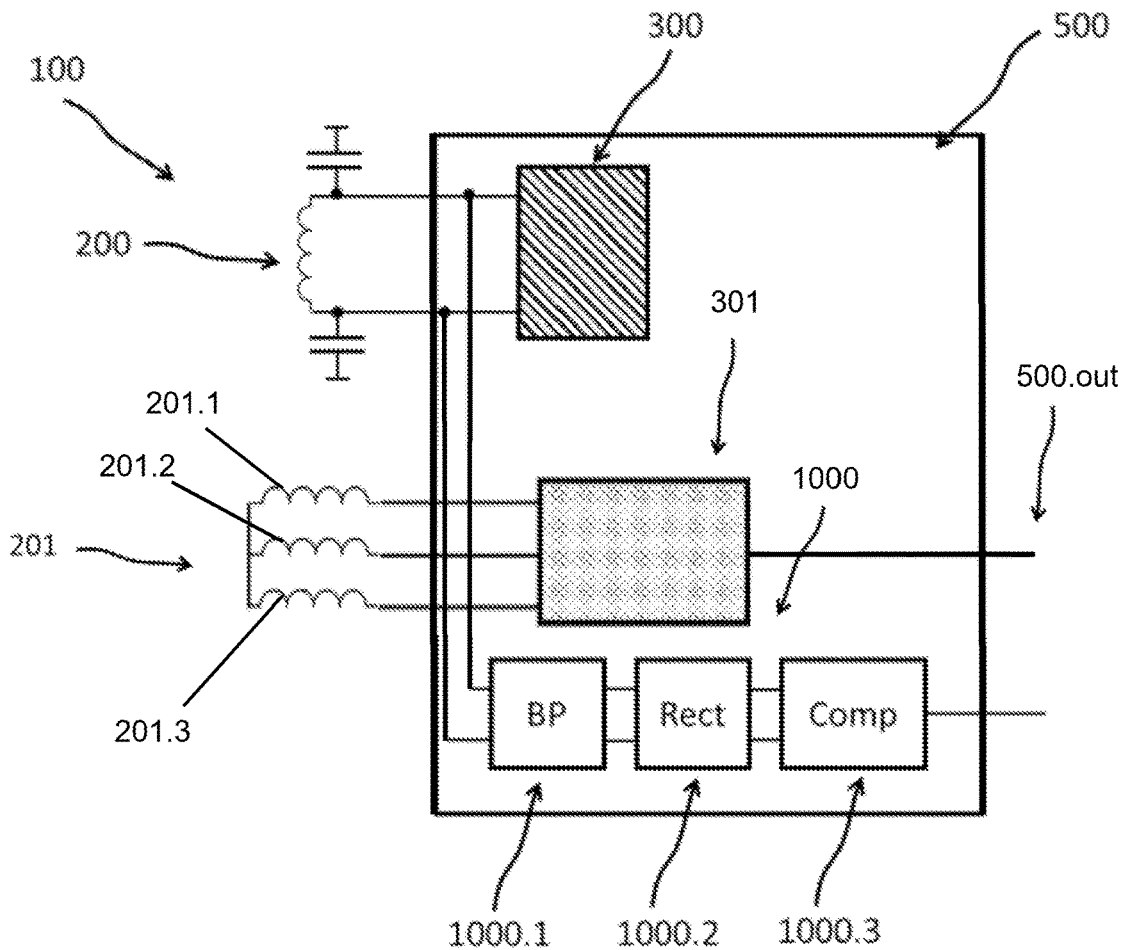
FIG. 2 shows an example of a sensor according to the invention.

FIG. 2 shows an example for evaluating the sinusoidal form of an excitation signal in a sensor according to the invention. In the first variant, many parts of the sensor correspond to those of a conventional sensor, as already illustrated above on the basis of FIG. 1. Parts of the sensor illustrated in FIG. 2, which are already known from the sensor according to FIG. 1, are identified by the same reference numerals in FIG. 2. With regard to these parts, reference is made to the description in FIG. 1. Only the parts of the sensor from FIG. 2 which are not included in the sensor according to FIG. 1 are described below.

According to the invention, a filter for checking sinusoidal form 1000 is provided, which is able to evaluate the sinusoidal form of the excitation signal.

Filter 1000 includes a bandpass filter 1000.1, and the excitation signal is filtered by bandpass filter 1000.1. For this purpose, an input of bandpass filter 1000.1 is connected to the output of the oscillator. The lower and upper limiting frequencies of the bandpass filter are preferably very close (not more than a few 100 kHz) to the resonance frequency of the resonant circuit, which is made up of exciter coil 200 and the capacitors. All harmonic wave portions which would not result from a non-sinusoidal oscillation are thus removed from the signal present at the output of bandpass filter 1000.1.

A rectifier 1000.2 is connected to the output of bandpass filter 1000.1. The filtered signal is rectified in rectifier 1000.2. The rectified signal may then be optionally smoothed to reduce the residual ripple.

The now filtered and rectified signal is subsequently compared with a predefined threshold value in a comparison unit 1000.3, whose input is connected to the output of the rectifier. If the signal prepared by bandpass filter 1000.1 and rectifier 1000.2 is below the limit value even though the amplitudes of the receiving coil signals are within the expected range, this indicates a high harmonic wave portion of the excitation. In a case of this type, the excitation signal is then not sinusoidal.

Figure 3:
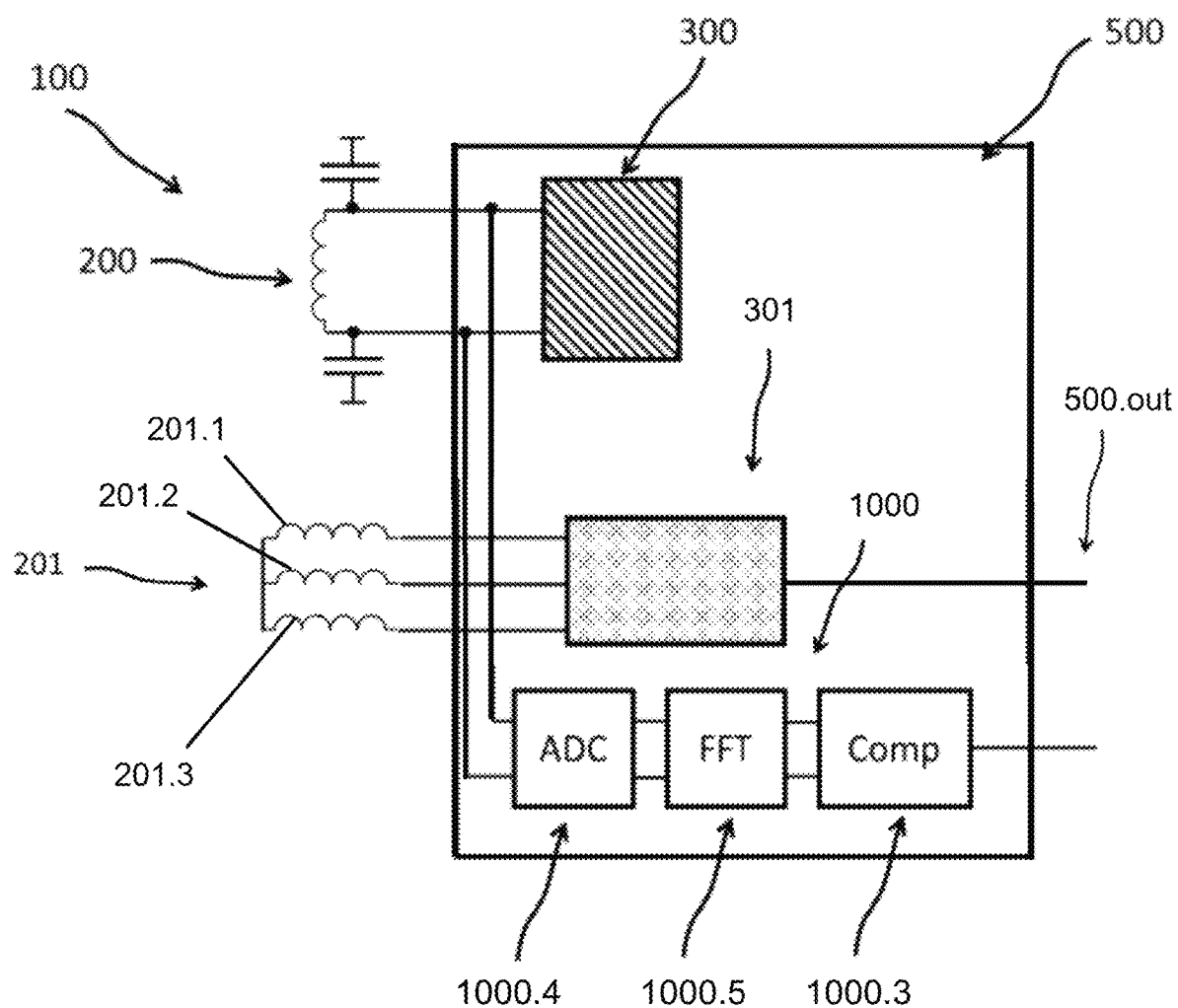
FIG. 3 shows an example of a sensor according to the invention.

FIG. 3 shows a second possibility for evaluating the sinusoidal form of the excitation signal.

Many parts of sensor 100 illustrated in FIG. 3 also corresponds to a known sensor, like the one shown in FIG. 1. A filter for checking sinusoidal form 1000 is also provided in the sensor according to FIG. 3.

This filter includes an analog/digital converter 1000.4, whose input is connected to an output of the oscillator. Analog/digital converter 1000.4 digitizes the excitation signal. A scanning frequency must be selected, which is at least two times higher and preferably ten times higher than the frequency of the excitation signal. The digitized excitation signal is present at an output of analog/digital converter 1000.4.

A transformation of the signal into its frequency portions subsequently takes place via an FFT unit 1000.5, which has an input connected to the output of analog/digital converter 1000.4.

It is now possible to determine whether the fundamental frequency has a suitably high amplitude with the aid of a comparison unit 1000.3. The input thereof is connected to an output of FFT unit 1000.5. If the value of the frequency portion in the fundamental frequency corresponds to a predefined value, it may be assumed that the excitation frequency is sinusoidal or almost sinusoidal. Any harmonic wave portions present in the output signal of FFT unit 1000.5 may also be examined and compared for this purpose with predefined values. Characteristic variables, such as the harmonic content or total harmonic distortion (THD) may also be calculated and compared with previously ascertained limit values.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inductive sensor comprising:
   an oscillator to generate a sinusoidal excitation signal having a first excitation frequency;
   a resonant circuit connected to the oscillator and configured to be excited by the excitation signal to generate an electromagnetic field;
   a coupling element, movable relative to the resonant circuit, to change the electromagnetic field as a function of a length or a rotation angle;
   a sensor to generate an electrical sensor signal as a function of the electromagnetic field;
   a measuring transducer to generate a measuring transducer output signal as a function of the electrical sensor signal, which represents the length or the rotation angle; and
   a checking filter to check a sinusoidal form of the excitation signal,
   wherein the checking filter includes an analog/digital converter to digitize an analog signal, the analog/digital converter having an input which is connected to an output of the oscillator or an output of a bandpass filter, wherein a pass band of the bandpass filter is selected such that the bandpass filter allows frequency portions of a signal in a range of the first excitation frequency to pass, and
   wherein the checking filter for checking the sinusoidal form includes an FFT unit, which has an input which is connected to an output of the analog/digital converter and transforms a signal present at the input into the range of the first excitation frequency.

2. The inductive sensor according to claim 1, wherein when the input of the analog/digital converter is connected to the output of the bandpass filter, an input of the bandpass filter is connected to the output of the oscillator.

3. The inductive sensor according to claim 1, wherein the inductive sensor is a length sensor or an angle sensor.

4. An inductive sensor comprising:
   an oscillator to generate a sinusoidal excitation signal having a first excitation frequency;
   a resonant circuit connected to the oscillator and configured to be excited by the excitation signal to generate an electromagnetic field;
   a coupling element, movable relative to the resonant circuit, to change the electromagnetic field as a function of a length or a rotation angle;
   a sensor to generate an electrical sensor signal as a function of the electromagnetic field;
   a measuring transducer to generate a measuring transducer output signal as a function of the electrical sensor signal, which represents the length or the rotation angle; and
   a checking filter to check a sinusoidal form of the excitation signal, wherein the checking filter for checking the sinusoidal form includes a bandpass filter, whose pass band is selected such that the bandpass filter allows frequency portions of a signal in a range of the first excitation frequency to pass, and wherein the bandpass filter has an input that is connected to an output of the oscillator, wherein the checking filter for checking the sinusoidal form includes a rectifier, which has an input which is connected to an output of the bandpass filter, and wherein the checking filter for checking the sinusoidal form includes a comparison unit, which has an input connected to an output of the rectifier or an output of a FFT unit, the comparison unit comparing an output signal of the rectifier or an amplitude of a fundamental frequency in an output signal of the FFT unit with a predefined value.

* * * * *